United States Patent [19]

Kamiyama et al.

[11] Patent Number: 5,346,798
[45] Date of Patent: Sep. 13, 1994

[54] SUSPENSION POLYMERIZATION METHOD AND TONER FOR ELECTROPHOTOGRAPHY OBTAINED THEREWITH

[75] Inventors: Masafumi Kamiyama; Masahiro Maeda; Hiroki Totsuka; Akihiro Sano; Toshiya Matsushita, all of Shizuoka, Japan

[73] Assignee: Tomoegawa Paper Co., Ltd., Tokyo, Japan

[21] Appl. No.: 30,652

[22] Filed: Mar. 12, 1993

[30] Foreign Application Priority Data

Mar. 18, 1992 [JP] Japan .................................. 4-091565
Mar. 18, 1992 [JP] Japan .................................. 4-091566
Mar. 18, 1992 [JP] Japan .................................. 4-091567
Mar. 18, 1992 [JP] Japan .................................. 4-091568
Mar. 18, 1992 [JP] Japan .................................. 4-091569
Mar. 18, 1992 [JP] Japan .................................. 4-091570

[51] Int. Cl.[5] .............................................. G03G 9/09
[52] U.S. Cl. ...................................... 430/137; 430/110
[58] Field of Search ........................ 430/137, 110, 111

[56] References Cited

U.S. PATENT DOCUMENTS 4,624,907 11/1986 Niimura et al. ...................... 430/110

FOREIGN PATENT DOCUMENTS 0443609 2/1991 European Pat. Off. .

OTHER PUBLICATIONS

EPO Search Report dated Jul. 20, 1993.

*Primary Examiner*—John Goodrow
*Attorney, Agent, or Firm*—Thompson, Hine and Flory

[57] ABSTRACT

The present invention provides a suspension polymerization method which provides polymerized particles exhibiting excellent charging properties and a toner composed of the polymerized particles obtained with the method. The method includes the steps of: placing a continuous phase component of an aqueous medium in a continuous phase vessel, and placing a dispersed phase component composed of a monomer composition and at least one solid compound having a specific structure in a dispersed phase vessel; continuously and simultaneously supplying each of the dispersed phase component and the continuous phase component to an apparatus for providing a shear force; exerting a shear force on the dispersed phase component and the continuous component to form a suspension material including polymerizable liquid-drops of a desired size; leading the suspension material to a polymerization vessel; subjecting the suspension material in the polymerization vessel to a polymerization reaction to form a polymerized material; and drying the polymerized material to obtain the polymerized particle.

22 Claims, 1 Drawing Sheet

SUSPENSION POLYMERIZATION METHOD AND TONER FOR ELECTROPHOTOGRAPHY OBTAINED THEREWITH

BACKGROUND OF THE INVENTION

1. Field of the Invention

The present invention relates to a novel suspension polymerization method which provides polymerized particles exhibiting excellent charging properties. The present invention pertains especially to a suspension polymerization method for producing a toner for use in electrophotography and the toner obtained therewith.

2. Prior art

Recently, polymerized particles utilized in the particles technology for their particle functionalities, have become increasingly important. The polymerized particles are employed in space-retention agents; lubricating agents; functional carriers; mono-disperse particles having surface activity; standardization particles; toners; and functional fillers for providing fluidity and/or polishing properties to a paint base. As the method for producing the polymerized particles, a polymerization method, a mechanical crushed method, or the like has been known. With regard to the polymerization method, in general, either an emulsion polymerization method or a suspension polymerization method may be employed.

In the conventional suspension polymerization method, polymerized particles are produced by adding a mixture composed of a monomer composition, a polymerization initiator, and the like to an aqueous medium, followed by polymerization of the mixture in the aqueous medium using a dispersing device. The advantages of the polymerized particles, obtained by the method described above, are that (1) the polymerized particles are spherical and exhibit an excellent fluidity, and (2) production of the polymerized particles is a simple and non-costly process. For this reason, it is proposed that the suspension polymerization method be applied to the production of a toner for use in electrophotography and the like, as disclosed in Japanese Patent Application Second Publication Nos. 36-10,231 and 47-51,830, and Japanese Patent Application First Publication No. 57-53,756.

In the toner for use in electrophotography, the charging properties thereof are generally controlled by dispersing a charge control agent in the toner particles. In addition, the selection of the appropriate raw materials for the toner are dependent on the system of the photocopier.

To date, the known compounds used as a negative control agent for maintaining a negative charge on the toner include a complex between a monoazo dye and a metal, a complex between salicylic acid and a metal, a salt between a salicylic acid derivative and a metal, and a complex between a metal and an azo compound including a phenylcarbamoylnaphthyl group. In addition, a nigrosine dye or a compound composed of a quaternary ammonium salt of naphthylsulfonic acid are the known compounds used as a positive charge control agent for maintaining a positive charge on the toner.

When a toner for use in electrophotography is produced by using a melt-kneading method, wherein a mixture of a binder resin, a coloring agent, and a compound such as the above-described complex, salt, or dye is mixed in a predetermined ratio, melt-kneaded and then pulverized, the resulting toner exhibits an excellent negative or positive charging property.

However, in the case of using the conventional suspension polymerization method described above, a compound such as the above-described complex, salt, or dye cannot be uniformly mixed with polymerized toner particles, resulting in a separation of the compound from the toner particles. For this reason, the polymerized toner particles cannot exhibit excellent charging properties. In addition, since a compound such as a complex, salt, or dye suitable for the suspension polymerization is not employed in the conventional suspension polymerization method, it is difficult for the toner particles to be appropriately charged.

SUMMARY OF THE INVENTION

It is therefore an objective of the present invention to provide a suspension polymerization method for producing a toner, including polymerized toner particles, which carry a sufficient positive or negative charge. According to the present invention, a charge control agent can be uniformly mixed with the polymerized toner particles by virtue of a specific compound such as a complex, a salt, or a dye which is included in the charge control agent.

A first aspect of the present invention is directed towards providing a suspension polymerization method for producing a polymerized particle comprising the steps of:

preparing a continuous phase component of an aqueous medium;

preparing a dispersed phase component which includes a monomer composition and at least one solid compound having a specific structure;

preparing suspension polymerization means including a continuous phase vessel for holding a continuous phase component, a dispersed phase vessel for holding a dispersed phase component, shearing means for providing a shear force, and a polymerization vessel for a polymerization reaction; and in turn placing the continuous phase component in the continuous phase vessel and the dispersed phase component in the dispersed phase vessel;

continuously and simultaneously supplying each of the dispersed phase component and the continuous phase component, separately, to the shearing means for providing a shear force;

exerting a shear force on the dispersed phase component and the continuous component in the shearing means to form a suspension material which includes polymerizable liquid drops of a desired size;

leading the suspension material to the polymerization vessel; and subsequently subjecting the suspension material in the polymerization vessel to a polymerization reaction to form the polymerized particle.

A second aspect of the present invention is directed towards a method for producing a toner for use in electrophotography which includes toner particles comprising the steps of:

preparing a continuous phase component of an aqueous medium;

preparing a dispersed phase component which includes a monomer composition and at least one solid compound having a specific structure;

preparing suspension polymerization means including a continuous phase vessel for holding a continuous phase component, a dispersed phase vessel for holding a dispersed phase component, shearing means for providing a shear force, and a polymerization vessel for a polymerization reaction; and in turn placing the continuous phase component in the continuous phase vessel and the dispersed phase component in the dispersed phase vessel;

continuously and simultaneously supplying each of the dispersed phase component and the continuous phase component, separately, to the shearing means for providing a shear force;

exerting a shear force on the dispersed phase component and the continuous component in the shearing means to form a suspension material which includes polymerizable liquid drops of a desired size;

leading the suspension material to the polymerization vessel; and subsequently subjecting the suspension material in the polymerization vessel to a polymerization reaction to form the polymerized particle.

A third aspect of the present invention is directed towards a toner for use in electrophotography composed of polymerized particles, produced by the method described above.

DETAILED DESCRIPTION OF THE INVENTION

The suspension polymerization method according to the present invention will be explained by reference to FIGS. 1 and 2.

Figure 1:
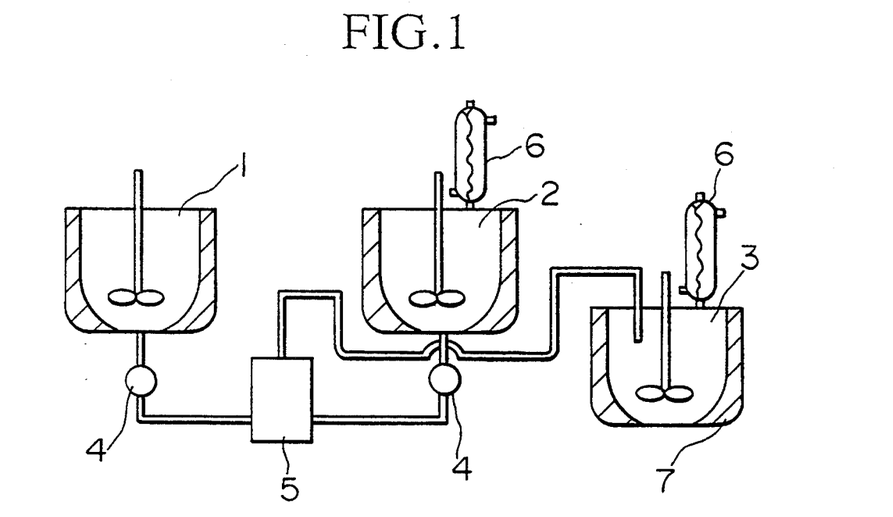
FIG. 1 is a schematic view showing an example of a device for the suspension polymerization employed in the present invention.

As shown in FIG. 1, a device for suspension polymerization comprises: a continuous phase vessel 1 for holding a continuous phase component; a dispersed phase vessel 2 for holding a dispersed phase component; a granulator 5; and a polymerization vessel 3 equipped with a condenser 6. The device is designed so that each of the continuous phase component and the dispersed phase component is simultaneously and continuously introduced into the granulator 5 via a precision pump 4 in a predetermined flow ratio of the two components. In the granulator 5, a shear force is exerted on each component to form a suspension. The suspension is guided to the polymerization vessel 3 and then subjected to a polymerization reaction. The polymerization reaction is completed by heating the suspension using a jacket heater 7 provided around the outer periphery of the polymerization vessel 3, so as to produce polymerized particles of a fine particle size and a narrowed distribution.

According to the present invention, a polymerized particle having sufficient charging properties, which cannot be obtained in the conventional suspension polymerization method, can be produced by virtue of including the following compound having the specific structure in the dispersed phase component.

In order to impart a sufficient negative charge to the polymerized particle, at least one solid compound represented by formula (A), (B), (C), or (D) must be employed, wherein $R_1$ and $R_2$ each represents independently a hydrogen atom, nitro group, halogen group, alkyl group, amino group, or carboxyl group; $R_3$ and $R_4$ each represents independently a hydrogen atom, alkyl group, carboxyl group, or nitro group; $R_5$ and $R_6$ each represents independently a hydrogen atom, alkyl group, carboxyl group, amino group, or nitro group; $M_1$ represents Zn, Fe, Ni, Co, or Cr; $M_2$ represents H, Na, K, or an organic ammonium salt; and n is an integer of 1 to 4, wherein $R_1$, $R_2$, $M_1$, $M_2$, and n are as defined above, wherein $R_1$, $R_2$, $M_1$, $M_2$, and n are as defined above, or wherein $R_1$, $R_3$, $R_5$, $M_1$, $M_2$, and n are as defined above.

In addition, so as to impart a sufficient positive charge to the polymerized particle, at least one solid compound represented by formula (E) or (F) must be employed, (E)

wherein $R_1$ and $R_2$ are as defined above, or (F)

wherein $R_7$, $R_8$, and $R_9$ each represents independently an alkyl group, phenyl group, phenylamino group, naphthyl group, or the derivative of the same; $R_{10}$ represents a hydrogen atom, hydroxy group, carboxyl group, amino group, nitro group, or halogen group; and X represents a sulfonyl anion group, phenylsulfonyl anion group, or the derivative of the same.

Figure 2:
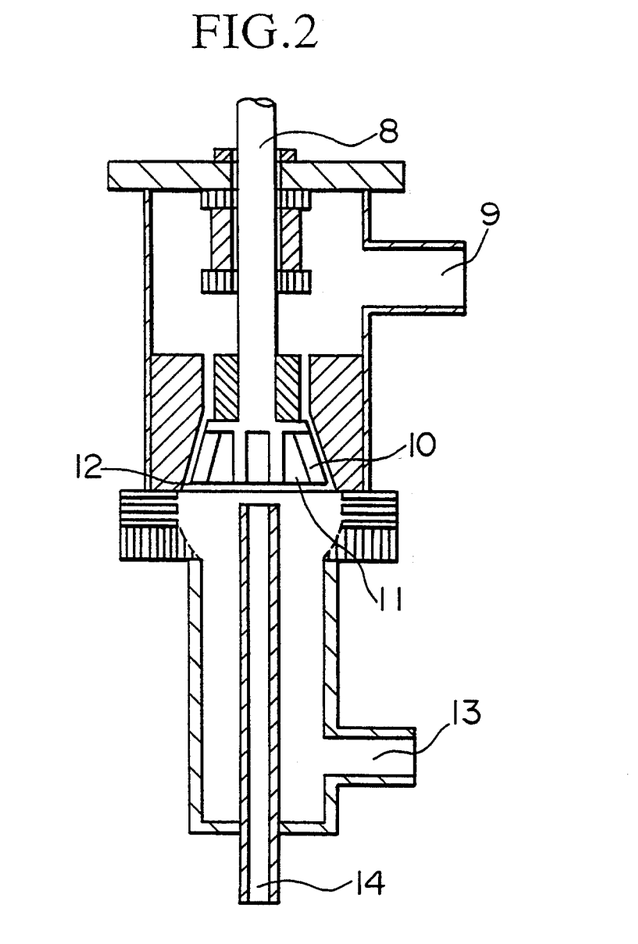
FIG. 2 is a schematic view showing an example of a granulator employed in the present invention.

One example of the granulator 5 is shown in FIG. 2. The granulator 5 comprises: a supply port for a dispersed phase 14; a supply port for a continuous phase 13; a shear region 11; a rotation axis 8; stirrer blades 10; spacing 12 for regulating the discharge of the suspension; and a discharge opening 9 for discharging the suspension. The stirrer blades 10 are fixed to the rotation axis 8 at the shear region 11 where each of the continuous phase component and the dispersed phase component is to be introduced. The stirrer blades 10 are rotated by rotating the rotation axis 8 and the suspension composed of the continuous phase component, and the dispersed phase component is produced at the shear region 11 by virtue of the shear force. The suspension passing through the spacing 12 disposed around the peripheral end portion of the shear region 11 is discharged from the discharge opening 9 and then guided to the polymerization vessel 3.

The dispersed phase component according to the present invention includes a monomer composition and at least one of the above-described compounds represented by formulae (A) to (F).

The following polymerizable monomers may be employed as the monomer composition: styrene; a styrene derivative including o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, or the like; an ethylene unsaturated mono-olefin including ethylene, propylene, butylene, isobutylene, or the like; a halogenated vinyl compound o including vinyl chloride, vinylidene chloride, vinyl bromide, vinyl fluoride, or the like; an organoacidic vinyl ester including vinyl acetate, vinyl propionate, vinyl benzoate, or the like; methacrylic acid; a methacrylic acid derivative including methyl methacrylate, ethyl methacrylate, propyl methacrylate, n-butyl methacrylate, n-octyl methacrylate, dodecyl methacrylate, 2-ethylhexyl methacrylate, stearyl methacrylate, phenyl methacrylate, dimethylaminoethyl methacrylate, diethylaminoethyl methacrylate, or the like; acrylic acid; an acrylic acid derivative including methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, phenyl acrylate, or the like; a vinyl ether including vinyl methyl ether, vinyl ethyl ether, vinyl isobutyl ether, or the like; a vinyl ketone including vinyl methyl ketone, vinyl hexyl ketone, vinyl isopropenyl ketone, or the like; an N-vinyl compound including N-vinyl pyrrole, N-vinyl carbazole, N-vinyl indole, N-vinyl pyrrolidone, or the like; a vinyl naphthalene; or a polymerizable monomer including acrylonitrile, methacrylonitrile, acrylamido, or the like.

These monomers may be employed alone or as a mixture thereof, as required.

In order to provide a functionality to the polymerized particle (i.e. toner particle), supplementary materials can be dispersed in the dispersed phase. The supplementary materials include various organic and inorganic pigments such as carbon black, dyes, resin additives, organic compounds, and the like.

The continuous phase employed in the present invention is formed by a continuous phase component of an aqueous medium. It is preferable that a suspension stabilizer be included in the continuous phase.

Water soluble polymers having both hydrophilic groups and hydrophobic groups in the molecule thereof are mainly employed as the suspension stabilizer. The suspension stabilizer has both (a) polar groups such as a hydroxy group, a carboxyl group and the salt of the same, a sulfonyl group and the salt of the same, and the like, as the hydrophilic group, and (b) non-polar groups such as aliphatic groups, aromatic groups, and the like, as the hydrophobic group. The suspension stabilizer is selected from the compounds which possess the abilities to prevent the monomer composition particles formed in the granulation step from fusing one another, and to stabilize the particles.

An example of the suspension stabilizer includes: a polyvinyl alcohol; a casein; a gelatin; a cellulose derivative such as methyl cellulose, methylhydroxypropyl cellulose, ethyl cellulose, or the like; starch and the derivative of the same; a polymethacrylic acid and the salt of the same; or the like. An inorganic powder such as calcium phosphate, fine-grained silica, or the like is often employed as the suspension stabilizer. The suspension stabilizer acts to prevent the liquid drops from fusing one another and agglomerating by virtue that the surfaces of the liquid drops are covered with the stabilizer during a polymerization step. In addition, as an auxiliary function of the stabilizer, sodium dodecyl sulfonate, sodium dodecylbenzene sulfonate, or the like can be added to the stabilizer so that it also functions as a surfactant.

EXAMPLES

The present invention will be explained in detail hereafter with reference to the examples. In the examples, all stated "parts" represent "parts by weight", unless indicated otherwise.

Example 1

As a continuous phase component, an aqueous solution of 1% of a polyvinyl alcohol (produced by Tokyo Kasei Co., Ltd., polymerization degree = approximately 2,000, saponification degree = approximately 80%) and 3% of sodium sulfate was prepared. The continuous phase component was placed in the continuous phase vessel 1 shown in FIG. 1.

A dispersed phase component was prepared as follows: 400 g of carbon black (produced by MITSUBISHI KASEI CORPORATION, "MA-100") was dispersed in a solution containing 15 g of 2,2'-azobis-(isobutyronitrile) dissolved in a mixture composed of 4,000 g of styrene and 1,000 g of butyl acrylate, followed by the dispersion therein of 200 g of the compound represented by formula (I) therein using an ultrasonic dispersing device, for 30 min., and consequently obtaining the dispersed phase component. The dispersed phase component was then placed into the dispersed phase vessel 2 shown in FIG. 1.

The dispersed phase component and the continuous phase component were supplied separately at a flow rate of 100 ml/min. and at a flow rate of 400 ml/min., respectively, for 10 minutes to a granulator 5 equipped with a rotation part having a diameter of 50 mm. The dispersed phase component and the continuous phase component were mixed and stirred at 10,000 rpm to obtain a dispersion of the dispersed phase component and the continuous phase component. The dispersion was then introduced into a polymerization vessel 3 shown in FIG. 1 while stirring at 300 rpm, wherein a polymerization reaction was then carried out for 8 hours at 80° C.

The reaction product was subjected to a separation treatment with a centrifuge in order to isolate polymerized particles. The polymerized particles were washed thoroughly with water, and then dried, obtaining a toner for use in electrophotography, composed of polymerized particles according to the present invention (hereafter, referred to as "Toner 1 of the present invention").

Example 2

A toner for use in electrophotography composed of polymerized particles according to the present invention (hereafter, referred to as "Toner 2 of the present invention") was obtained by repeating the same steps disclosed in Example 1, except that the compound represented by formula (II) was employed instead of the compound represented by formula (I) in Example 1.

Example 3

A toner for use in electrophotography composed of polymerized particles according to the present invention (hereafter, referred to as "Toner 3 of the present invention") was obtained by repeating the same steps disclosed in Example 1, except that the compound represented by formula (III) was employed instead of the compound represented by formula (I) in Example 1.

Example 4

A toner for use in electrophotography composed of polymerized particles according to the present invention (hereafter, referred to as "Toner 4 of the present invention") was obtained by repeating the same steps disclosed in Example 1, except that the compound represented by formula (IV) was employed instead of the compound represented by formula (I) in Example 1.

Example 5

A toner for use in electrophotography composed of polymerized particles according to the present invention (hereafter, referred to as "Toner 5 of the present invention") was obtained by repeating the same steps disclosed in Example 1, except that the compound represented by formula (V) was employed instead of the compound represented by formula (I) in Example 1.

Example 6

A toner for use in electrophotography composed of polymerized particles according to the present invention (hereafter, referred to as "Toner 6 of the present invention") was obtained by repeating the same steps disclosed in Example 1, except that the compound represented by formula (VI) was employed instead of the compound represented by formula (I) in Example 1.

Example 7

A toner for use in electrophotography composed of polymerized particles according to the present invention (hereafter, referred to as "Toner 7 of the present invention") was obtained by repeating the same steps disclosed in Example 1, except that the compound represented by formula (VII) was employed instead of the compound represented by formula (I) in Example 1.

Example 8

A toner for use in electrophotography composed of polymerized particles according to the present invention (hereafter, referred to as "Toner 8 of the present invention") was obtained by repeating the same steps disclosed in Example 1, except that the compound represented by formula (VIII) was employed instead of the compound represented by formula (I) in Example 1.

Example 9

A toner for use in electrophotography composed of polymerized particles according to the present invention (hereafter, referred to as "Toner 9 of the present invention") was obtained by repeating the same steps disclosed in Example 1, except that the compound represented by formula (IX) was employed instead of the compound represented by formula (I) in Example 1.

Example 10

A toner for use in electrophotography composed of polymerized particles according to the present invention (hereafter, referred to as "Toner 10 of the present invention") was obtained by repeating the same steps disclosed in Example 1, except that the compound represented by formula (X) was employed instead of the compound represented by formula (I) in Example 1.

Example 11

A toner for use in electrophotography composed of polymerized particles according to the present invention (hereafter, referred to as "Toner 11 of the present invention") was obtained by repeating the same steps disclosed in Example 1, except that the compound represented by formula (XI) was employed instead of the compound represented by formula (I) in Example 1.

Example 12

A toner for use in electrophotography composed of polymerized particles according to the present invention (hereafter, referred to as "Toner 12 of the present invention") was obtained by repeating the same steps disclosed in Example 1, except that the compound represented by formula (XII) was employed instead of the compound represented by formula (I) in Example 1.

Comparative Example 1

A comparative toner for electrophotography composed of polymerized particles (hereafter, referred to as "Comparative Toner 1") was obtained by repeating the same steps disclosed in Example 1, except that 200 g of a charge control agent consisting of a styrene containing polymer including an acidic group (produced by FUJIKURA KASEI Co., Ltd., "FCA-1001N") was employed instead of the compound represented by formula (I) in Example 1.

Comparative Example 2

As a continuous phase component, an aqueous solution of 1% of a polyvinyl alcohol (produced by Tokyo Kasei Co., Ltd., polymerization degree: approximately 2,000, saponification degree: approximately 80%) and 3% of sodium sulfate was prepared. The continuous phase component was directly placed in a 10 liter polymerization vessel equipped with a jacket that is thermally controlled by an electric heater.

A dispersed phase component was prepared as follows: 80 g of carbon black (produced by MITSUBISHI KASEI CORPORATION, "MA-100") was dispersed into a solution containing 3 g of 2,2'-azobis(isobutyronitrile) dissolved in a mixture composed of 800 g of styrene and 200 g of butyl acrylate, followed by the dispersion therein of 40 g of the compound represented by formula (I), which is the same as the compound employed in Example 1, therein using an ultrasonic dispersing device, for 30 min., to obtain the dispersed phase component. The dispersed phase component was added in the polymerization vessel in which the continuous phase component had been placed. Here, the step of exerting a shear force on the continuous phase component and the dispersed phase component in the granulator 5, as described in Example 1, was omitted.

While the dispersed phase component and the continuous phase component in the polymerization vessel were stirred at 1,000 rpm using a dispersing device (Homomixer M type, produced by Tokushukikakogyo Co., Ltd.) with which the polymerization vessel was equipped, the mixture was heated to 80° C. and maintained at this temperature for 3 hr. In the polymerization vessel, a polymerization reaction between the dispersed phase component and the continuous phase component was completed while stirring at 1,500 rpm for 5 hours.

The reaction product was subjected to a separation treatment with a centrifuge in order to isolate polymerized particles. The polymerized particles were washed thoroughly with water, and then dried, obtaining a comparative toner for use in electrophotography composed of polymerized particles (hereafter, referred to as "Comparative Toner 2").

Observation of the polymerized particles of Comparative Toner 2, under a microscope, showed that the particles included spherical resin particles and many irregularly-shaped fine particles. Analysis of the irregularly-shaped fine particles showed that the main ingredient of the fine particles was the compound represented by formula (I). Therefore, it is conjectured that the compound represented by formula (I) could not be incorporated into the polymerized particles. In addition, the polymerized particles of Comparative Toner 2 had a broad particle size distribution, extending from a fine particle size to a rough particle size. Therefore, in Comparative Example 2, the particle size could not be controlled.

As described above, with the conventional suspension polymerization method, it was not possible to control particle size, since it was difficult for the particle to incorporate the compound represented by formula (I).

Comparative Example 3

A comparative toner for electrophotography composed of polymerized particles (hereafter, referred to as "Comparative Toner 3") was obtained by repeating the same steps disclosed in Comparative Example 2, except that the compound represented by formula (IV), which is the same as the compound employed in Example 4, was employed instead of the compound represented by formula (I) in Comparative Example 2.

Observation of the polymerized particles of Comparative Toner 3, under a microscope, showed that the particles included spherical resin particles and many irregularly-shaped fine particles. Analysis of the irregularly-shaped fine particles showed that the main ingredient of the fine particles was the compound represented by formula (IV). Therefore, it is conjectured that the compound represented by formula (IV) could not be incorporated into the polymerized particles. In addition, the polymerized particles of Comparative Toner 3 had a broad particle size distribution, extending from a fine particle size to a rough particle size. Therefore, in Comparative Example 3, the particle size could not be controlled.

As described above, with the conventional suspension polymerization method, it was not possible to control particle size, since it was difficult for the particle to incorporate the compound represented by formula (IV).

Comparative Example 4

A comparative toner for electrophotography composed of polymerized particles (hereafter, referred to as "Comparative Toner 4") was obtained by repeating the same steps disclosed in Comparative Example 2, except that the compound represented by formula (VII), which is the same as the compound employed in Example 7, was employed instead of the compound represented by formula (I) in Comparative Example 2.

Observation of the polymerized particles of Comparative Toner 4 under a microscope showed that the particles included spherical resin particles and many irregular-shaped fine particles. Analysis of the irregular-shaped fine particles showed that the main ingredient of the particles was the compound represented by formula (VII). Therefore, it is conjectured that the compound represented by formula (VII) could not be o incorporated into the polymerized particles. In addition, the polymerized particles of Comparative Toner 4 had a broad particle size distribution, extending from a fine particle size to a rough particle size. Therefore, in Comparative Example 4, the particle size could not be controlled.

As described above, with the conventional suspension polymerization method, it was not possible to control particle size, since it was difficult for the particle to incorporate the compound represented by formula (VII).

Comparative Example 5

A comparative toner for electrophotography composed of polymerized particles (hereafter, referred to as "Comparative Toner 5") was obtained by repeating the same steps disclosed in Comparative Example 2, except that the compound represented by formula (X), which is the same as the compound employed in Example 10, was employed instead of the compound represented by formula (I) in Comparative Example 2.

Observation of the polymerized particles of Comparative Toner 5, under a microscope, showed that the particles included spherical resin particles and many irregularly-shaped fine particles. Analysis of the irregular-shaped fine particles showed that the main ingredient of the fine particles was the compound represented by formula (X). Therefore, it is conjectured that the compound represented by formula (X) could not be incorporated into the polymerized particles. In addition, the polymerized particles of Comparative Toner 5 had a broad particle size distribution, extending from a fine particle size to a rough particle size. Therefore, in Comparative Example 5, the particle size could not be controlled.

As described above, with the conventional suspension polymerization method, it was not possible to control particle size, since it was difficult for the particle to incorporate the compound represented by formula (X).

Example 13

As a continuous phase component, an aqueous solution of 1% of a polyvinyl alcohol (produced by Tokyo Kasei Co., Ltd., polymerization degree = approximately 2,000, saponification degree = approximately 80%) and 3% of sodium sulfate was prepared. The continuous phase component was placed in the continuous phase vessel 1 shown in FIG. 1.

A dispersed phase component was prepared as follows: 400 g of carbon black (produced by MITSUBISHI KASEI CORPORATION, "MA-100") was dispersed into a solution containing 15 g of 2,2'-azobis-(isobutyronitrile) dissolved in a mixture composed of 4,000 g of styrene and 1,000 g of butyl acrylate, followed by the dispersion therein of 100 g of the dye including the compounds represented by formulae (XIII) and (XIV), using an ultrasonic dispersing device, for 30 min., to obtain the dispersed phase component. The dispersed phase component was placed in the dispersed phase vessel 2 shown in FIG. 1

The dispersed phase component and the continuous phase component were supplied separately at a flow rate of 100 ml/min. and at a flow rate of 400 ml/min., respectively, for 10 minutes to a granulator 5 equipped with a rotation part having a diameter of 50 mm. The dispersed phase component and the continuous phase component were mixed and stirred at 10,000 rpm to obtain a dispersion of the dispersed phase component and the continuous phase component. The dispersion was then introduced into a polymerization vessel 3 shown in FIG. 1 while stirring at 300 rpm, wherein a polymerization reaction was then carried out for 8 hours.

The reaction product was subjected to a separation treatment with a centrifuge in order to isolate polymerized particles. The polymerized particles were washed thoroughly with water, and then dried, obtaining a toner for use in electrophotography composed of polymerized particles according to the present invention (hereafter, referred to as "Toner 13 of the present invention").

Example 14

A toner for use in electrophotography composed of polymerized particles according to the present invention (hereafter, referred to as "Toner 14 of the present invention") was obtained by repeating the same steps disclosed in Example 13, except that the dye was employed in the amount of 200 g instead of 100 g in Example 13.

Example 15

A toner for use in electrophotography composed of polymerized particles according to the present invention (hereafter, referred to as "Toner 15 of the present invention") was obtained by repeating the same steps disclosed in Example 13, except that the compound represented by formula (XV) was employed instead of the dye including the compounds represented by formulae (XIII) and (XIV) in Example 13.

(XV)

Example 16

A toner for use in electrophotography composed of polymerized particles according to the present invention (hereafter, referred to as "Toner 16 of the present invention") was obtained by repeating the same steps disclosed in Example 13, except that the compound represented by formula (XVI) was employed instead of the dye including the compounds represented by formulae (XIII) and (XIV) in Example 13.

(XVI)

Example 17

A toner for use in electrophotography composed of polymerized particles according to the present invention (hereafter, referred to as "Toner 17 of the present invention") was obtained by repeating the same steps disclosed in Example 13, except that the compound represented by formula (XVII) was employed instead of the dye including the compounds represented by formulae (XIII) and (XIV) in Example 13.

(XVII)

Example 18

A toner for use in electrophotography composed of polymerized particles according to the present invention (hereafter, referred to as "Toner 18 of the present invention") was obtained by repeating the same steps disclosed in Example 13, except that the compound represented by formula (XVIII) was employed instead of the dye including the compounds represented by formulae (XIII) and (XIV) in Example 13.

(XVIII)

Comparative Example 6

A comparative toner for electrophotography composed of polymerized particles (hereafter, referred to as "Comparative Toner 6") was obtained by repeating the same steps disclosed in Example 13, except that 200 g of charge control agent of a styrene-acryl containing polymer including a quaternary ammonium salt (produced by FUJIKURA KASEI Co., Ltd., "FCA-201PB") was employed instead of the dye including the compounds represented by formulae (XIII) and (XIV) in Example 13.

Comparative Example 7

As a continuous phase component, an aqueous solution of 1% of a polyvinyl alcohol (produced by Tokyo Kasei Co., Ltd., polymerization degree: approximately 2,000, saponification degree: approximately 80%) and 3% of sodium sulfate was prepared. The continuous phase component (aqueous solution) was directly placed in a 10 liter polymerization vessel equipped with a jacket that is thermally controlled by an electric heater.

A dispersed phase component was prepared as follows: 80 g of carbon black (produced by MITSUBISHI KASEI CORPORATION, "MA-100") was dispersed into a solution of 3 g of 2,2'-azobis(isobutyronitrile) dissolved in a mixture composed of 800 g of styrene and 200 g of butyl acrylate, followed by dispersion therein of 40 g of the dye, which is the same as the dye employed in Example 13, using an ultrasonic dispersing device, for 30 min., to obtain the dispersed phase component. The dispersed phase component was added in the polymerization vessel in which the continuous phase component had been placed. Here, the step of exerting a shear force on the continuous phase component and the dispersed component in the granulator 5, as described in Example 13, was omitted.

While the dispersed phase component and the continuous phase component in the polymerization vessel were stirred at 1,000 rpm using a dispersing device (Homomixer M type, produced by Tokushukikakogyo Co., Ltd.) which the polymerization vessel was equipped with, the mixture was heated to 80° C. and maintained at this temperature for 3 hr. In the polymerization vessel, a polymerization reaction between the dispersed phase component and the continuous phase component was completed while stirring at 1,500 rpm for 5 hours.

The reaction product was subjected to a separation treatment with a centrifuge in order to isolate polymerized particles. The polymerized particles were washed thoroughly with water, and then dried, obtaining a comparative toner for use in electrophotography composed of polymerized particles (hereafter, referred to as "Comparative Toner 7").

Observation of the polymerized particles of Comparative Toner 7, under a microscope, showed that the particles included spherical resin particles and many irregularly-shaped fine particles. Analysis of the irregularly-shaped fine particles showed that the main ingredient of the fine particles was the dye. Therefore, it is conjectured that the dye could not be incorporated into the polymerized particles. In addition, the polymerized particles of Comparative Toner 7 had a broad particle size distribution, extending from a fine particle size to a rough particle size. Therefore, in Comparative Example 7, the particle size could not be controlled.

As described above, with the conventional suspension polymerization method, it was not possible to control particle size, since it was difficult for the particle to incorporate the dye.

Comparative Example 8

A comparative toner for electrophotography composed of polymerized particles (hereafter, referred to as "Comparative Toner 8") was obtained by repeating the same steps disclosed in Comparative Example 7, except that the compound represented by formula (XV), which was the same as the compound employed in Example 15, was employed instead of the dye in Comparative Example 7.

Observation of the polymerized particles of Comparative Toner 8 under a microscope showed that the particles included spherical resin particles and many irregularly-shaped fine particles. Analysis of the irregularly-shaped fine particles showed that the main ingredient of the fine particles was the compound represented by formula (XV). Therefore, it is conjectured that the compound represented by formula (XV) could not be incorporated into the polymerized particles. In addition, the polymerized particles of Comparative Toner 8 had a broad particle size distribution, extending from a fine particle size to a rough particle size. Therefore, in Comparative Example 8, the particle size could not be controlled.

As described above, with the conventional suspension polymerization method, it was not possible to control particle size, since it was difficult for the particle to incorporate the compound represented by formula (XV).

A mixture of 50 g of iron powder (FV200–300, produced by NIPPON IRON POWDER Co., Ltd.), 4 g of each of Toners 1 to 18 of the present invention and Comparative Toners 1 to 8 was placed in a 100 cc polyethylene vessel and then the vessel was sealed. The mixture was stirred for 10 min. using a ball-mill stirrer. Subsequently, the amount of friction charge in each of Toners 1 to 18 of the present invention and Comparative Toners 1 to 8 was measured using a blow-off friction charge tester (produced by Toshiba Chemical Co., Ltd.). The results are shown in Table 1 and Table 2.

TABLE 1

| Toner Sample | Amount of Charge ($\mu$C/g) |
| --- | --- |
| Toner 1 of the present invention | −31.6 |
| Toner 2 of the present invention | −36.9 |
| Toner 3 of the present invention | −42.3 |
| Toner 4 of the present invention | −36.5 |
| Toner 5 of the present invention | −42.8 |
| Toner 6 of the present invention | −39.9 |
| Toner 7 of the present invention | −35.5 |
| Toner 8 of the present invention | −39.2 |
| Toner 9 of the present invention | −31.2 |
| Toner 10 of the present invention | −42.6 |
| Toner 11 of the present invention | −48.1 |
| Toner 12 of the present invention | −46.3 |
| Comparative Toner 1 | −9.5 |

TABLE 1-continued

| Toner Sample | Amount of Charge ($\mu$C/g) |
| --- | --- |
| Comparative Toner 2 | unmeasurable |
| Comparative Toner 3 | unmeasurable |
| Comparative Toner 4 | unmeasurable |
| Comparative Toner 5 | unmeasurable |

As will be apparent from the results shown in Table 1, the toners of the present invention, according to Toners 1 to 12 of the present invention, carried sufficient negative charge, in comparison with the comparative toners according to Comparative Toners 1 to 5.

TABLE 2

| Toner Sample | Amount of Charge ($\mu$C/g) |
| --- | --- |
| Toner 13 of the present invention | +35.6 |
| Toner 14 of the present invention | +42.9 |
| Toner 15 of the present invention | +23.6 |
| Toner 16 of the present invention | +26.8 |
| Toner 17 of the present invention | +30.4 |
| Toner 18 of the present invention | +32.9 |
| Comparative Toner 6 | +11.5 |
| Comparative Toner 7 | unmeasurable |
| Comparative Toner 8 | unmeasurable |

As will be apparent from the results shown in Table 2, the toners of the present invention, according to Toners 13 to 18 of the present invention, carried sufficient positive charge, in comparison with the comparative toners according to Comparative Toners 6 to 8.

As described above, the suspension polymerization method of the present invention is able to provide polymerized particles carrying sufficient negative or positive charges.

The present invention has been described in detail with respect to examples, and it should now be apparent from the foregoing, to those skilled in the art, that changes and modifications may be made without departing from the invention in its broader aspects, and it is the intention, therefore, in the appended claims to cover all such changes and modifications that fall within the true spirit of the invention.

What is claimed is:

1. A suspension polymerization method for producing a negatively or positively charged polymerized particle comprising the steps of:

preparing a continuous phase component of an aqueous medium;

preparing a dispersed phase component comprising a monomer composition and at least one solid compound which acts as a charge control agent for maintaining a negative or positive charge on said polymerized particle;

preparing suspension polymerization means comprising a continuous phase vessel for holding a continuous phase component, a dispersed phase vessel for holding a dispersed phase component, shearing means for providing a shear force, and a polymerization vessel for polymerization reaction; and in turn placing the continuous phase component in the continuous phase vessel and the dispersed phase component in the dispersed phase vessel;

continuously and simultaneously supplying each of the dispersed phase component and the continuous phase component, separately, to the shearing means for providing a shear force;

exerting a shear force on the dispersed phase component and the continuous component in the shearing means to form a suspension material comprising polymerizable liquid drops of a desired size;

leading the suspension material to the polymerization vessel; and subsequently subjecting the suspension material in the polymerization vessel to a polymerization reaction to form said negatively or positively charged polymerized particle.

2. A suspension polymerization method as recited in claim 1, wherein said solid compound is selected from the group consisting of compounds represented by formulae (A) to (F):

wherein $R_1$ and $R_2$ each represents independently a hydrogen atom, nitro group, halogen group, alkyl group, amino group, or carboxyl group; $R_3$ and $R_4$ each represents independently a hydrogen atom, alkyl group, carboxyl group, or nitro group; $R_5$ and $R_6$ each represents independently a hydrogen atom, alkyl group, carboxyl group, amino group, or nitro group; $M_1$ represents Fe, Ni, Co, or Cr; $M_2$ represents H, Na, K, or an organic 920 ammonium salt; and n is an integer of 1 to 4, wherein $R_1$, $R_2$, $M_1$, $M_2$, and n are as defined above, wherein $R_1$, $R_2$, $M_1$, $M_2$, and n are as defined above, wherein $R_1$, $R_3$, $R_5$, $M_1$, $M_2$, and n are as defined above, wherein $R_1$ and $R_2$ are as defined above, and wherein $R_7$, $R_8$, and $R_9$ each represents independently an alkyl group, phenyl group, phenylamino group, naphthyl group, or the derivative of the same; $R_{10}$ represents a hydrogen atom, hydroxy group, carboxyl group, amino group, nitro group, or halogen group; and X represents a sulfonyl anion group, phenylsulfonyl anion group, or the derivative of the same.

3. A suspension polymerization method as recited in claim 1, wherein the monomer composition in the dispersed phase component comprises at least one monomer selected from the group consisting of a styrene, a styrene derivative, an ethylene unsaturated mono-olefin, a halogenated vinyl compound, an organoacidic vinyl ester, a methacrylic acid, a methacrylic acid derivative, an acrylic acid, an acrylic acid derivative, a vinyl ester, a vinyl ketone, an N-vinyl compound, a vinyl naphthalene, an acrylonitrile, a methacrylonitrile, and an acrylamido.

4. A suspension polymerization method as recited in claim 1, wherein the dispersed phase component further comprises at least one supplementary material selected from the group consisting of an organic pigment, an inorganic pigment, a dye, a resin additive, and an organic compound.

5. A suspension polymerization method as recited in claim 1, wherein the continuous phase component further comprises a suspension stabilizer having at least one hydrophilic group and at least one hydrophobic group in a molecule of the stabilizer.

6. A suspension polymerization method as recited in claim 5, wherein the suspension stabilizer is a material selected from the group consisting of a polyvinyl alcohol, a casein, a gelatin, a cellulose derivative, a starch, a starch derivative, a polymethacrylic acid, a salt of the polymethacrylic acid, a calcium phosphate, and a fine-grained silica.

7. A suspension polymerization method as recited in claim 1, wherein said negatively or positively charged polymerized particle is a toner particle for use in electrophotography.

8. A toner for use in electrophotography comprising negatively or positively charged polymerized particles, produced by the steps of:
 preparing for a continuous phase component of an aqueous medium;
 preparing a dispersed phase component comprising a monomer composition and at least one solid compound which acts as a charge control agent for maintaining a negative or positive charge on said polymerized particle;
 preparing suspension polymerization means including a continuous phase vessel for holding a continuous phase component, a dispersed phase vessel for holding a dispersed phase component, shearing means for providing a shear force, and a polymerization vessel for a polymerization reaction; and in turn
 placing the continuous phase component in the continuous phase vessel and the dispersed phase component in the dispersed phase vessel;
 continuously and simultaneously supplying each of the dispersed phase component and the continuous phase component in the shearing means to form a suspension material including polymerizable liquid-drops of a desired size;
 leading the suspension material to the polymerization vessel; and
 subsequently subjecting the suspension material in the polymerization vessel to a polymerization reaction to form a polymerized material to obtain said negatively or positively charged polymerized particle.

9. A toner for use in electrophotography as recited in claim 8, wherein said solid compound is selected from the group consisting of compounds represented by formulae (A) to (F):

wherein $R_1$ and $R_2$ each represents independently a hydrogen atom, nitro group, halogen group, alkyl group, amino group, or carboxyl group; $R_3$ and $R_4$ each represents independently a hydrogen atom, alkyl group, carboxyl group, or nitro group; $R_5$ and $R_6$ each represents independently a hydrogen atom, alkyl group, carboxyl group, amino group, or nitro group; $M_1$ represents Zn, Fe, Ni, Co, or Cr; $M_2$ represents H, Na, K, or an organic ammonium salt; and n is an integer of 1 to 4, wherein $R_1$, $R_2$, $M_1$, $M_2$ and n are as defined above, wherein $R_1$, $R_2$, $M_1$, $M_2$, and n are as defined above, wherein $R_1$, $R_3$, $R_3$, $R_5$, $M_1$, $M_2$, and n are as defined above, wherein $R_1$ and $R_2$ are as defined above, and wherein $R_7$, $R_8$, and $R_9$ each represents independently an alkyl group, phenyl group, phenylamino group, naphthyl group, or the derivative of the same; $R_{10}$ represents a hydrogen atom, hydroxy group, carboxyl group, amino group, nitro group, or halogen group; and X represents a sulfonyl anion group, phenylsulfonyl anion group, or the derivative of the same.

10. A toner for use in electrophotography as recited in claim 9, wherein said toner carries a negative charge and wherein said solid compound is selected from the group consisting of compounds represented by formulae (A) to (D).

11. A toner for use in electrophotography as recited in claim 9, wherein said toner carries a positive charge and wherein said solid compound is selected from the group consisting of compounds represented by formulae (E) and (F).

12. A toner for use in electrophotography as recited in claim 9, wherein the monomer composition in the dispersed phase component comprises at least one monomer selected from the group consisting of a styrene, a styrene derivative, an ethylene unsaturated mono-olefin, a halogenated vinyl compound, an organoacidic vinyl ester, a methacrylic acid, a methacrylic acid derivative, an acrylic acid, an acrylic acid derivative, a vinyl ether, a vinyl ketone, an N-vinyl compound, a vinyl napthalene; acrylonitrile, a methacrylonitrile, and an acrylamido.

13. A toner for use in electrophotography as recited in claim 10, wherein said solid compound is incorporated into the polymerized particles.

14. A toner for use in electrophotography as recited in claim 11, wherein said solid compound is incorporated into the polymerized particles.

15. A method for producing a toner for use in electrophotography which includes toner particles comprising the steps of:

preparing a continuous phase component of an aqueous medium;

preparing a dispersed phase component comprising a monomer composition and at least one solid compound which acts as a charge control agent for maintaining a negative or positive charge on said polyermized particle;

preparing suspension polyermization means including a continuous phase vessel for holding a continuous phase component, a dispersed phase vessel for holding a dispersed phase component, shearing means for providing a shear force, and a polymerization vessel for polymerization reaction; and in turn placing the continuous phase component in the continuous phase vessel and the dispersed phase component in the dispersed phase vessel;

continuously and simultaneously supplying each of the dispersed phase component and the continuous phase component, separately, to the shearing means for providing a shear force;

exerting a shear force on the dispersed phase component and the continuous component in the shearing means to form a suspension material including polymerizable liquid drops of a desired size;

leading the suspension material to the polymerization vessel; and subsequently subjecting the suspension material in the polymerization vessel to a polymerization reaction to form the negatively or positively charged polymerized particle.

16. A method for producing a toner for use in electrophotography as recited in claim 15, wherein said solid compound is selected from the group consisting of compounds represented by formulae (A) to (F):

wherein $R_1$ and $R_2$ each represents independently a hydrogen atom, nitro group, halogen group, alkyl group, amino group, or carboxyl group; $R_3$ and $R_4$ each represents independently a hydrogen atom, alkyl group, carboxyl group, or nitro group; $R_5$ and $R_6$ each represents independently a hydrogen atom, alkyl group, carboxyl group, amino group, or nitro group; $M_1$ represents Zn, Fe, Ni, Co, or Cr; $M_2$ represents H, Na, K, or an organic ammonium salt; and n is an integer of 1 to 4, wherein $R_1$, $R_2$, $M_1$, $M_2$, and n are as defined above, wherein $R_1$, $R_2$, $M_1$, $M_2$, and n are as defined above, wherein $R_1$, $R_3$, $R_5$, $M_1$, $M_2$, and n are as defined above, wherein $R_1$ and $R_2$ are as defined above, and wherein $R_7$, $R_8$, and $R_9$ each represents independently an alkyl group, phenyl group, phenylamino group, napthyl group, or the derivative of the same; $R_{10}$ represents a hydrogen atom, hydroxy group, carboxyl group, amino group, nitro group, or halogen group; and X represents a sulfonyl anion group, phenylsulfonyl anion group, or the derivative of the same.

17. A method for producing a toner for use in electrophotography as recited in claim 15, wherein the monomer composition in the dispersed phase component comprises at least one monomer selected from the group consisting of a styrene, a styrene derivative, an ethylene unsaturated mono-olefin, a halogenated vinyl compound, an organoacidic vinyl ester, a methacrylic acid, a m ethacrylic acid derivative, an acrylic acid, an acrylic acid derivative, a vinyl ether, a vinyl ketone, an N-vinyl compound, a vinyl naphthalene, a acrylonitrile, a methacrylonitrile, and an acrylamido.

18. A method for producing a toner for use in electrophotography as recited in claim 15, wherein said dispersed phase component further comprises at least one supplementary material selected from the group consisting of an organic pigment, an inorganic pigment, a dye, a resin additive, and an organic compound.

19. A method for producing a toner for use in electrophotography as recited in claim 15, wherein said continuous phase component further comprises a suspension stabilizer having at least one hydrophilic group and at least one hydrophobic group in a molecule of the stabilizer.

20. A method for producing a toner for use in electrophotography as recited in claim 15, wherein the suspension stabilizer is a material selected from the group consisting of a polyvinyl alcohol, a casein, a gelatin, a cellulose derivative, a starch, a starch derivative, a polymethacrylic acid, a salt of the polymethacrylic acid, calcium phosphate, and a fine-grained silicia.

21. A method for producing a toner for use in electrophotography as recited in claim 16, wherein said toner carries a negative charge and wherein said solid compound is selected from the group consisting of compounds represented by formulae (A) to (D).

22. A method for producing a toner for use in electrophotography as recited in claim 16, wherein said toner carries a positive charge and wherein said solid compound is selected from the group consisting of compounds represented by formulae (E) and (F).

* * * * *